United States Patent
Wilson

(10) Patent No.: US 10,586,217 B2
(45) Date of Patent: Mar. 10, 2020

(54) AUTOMOTIVE ECU MOBILE PHONE INTERFACE

(71) Applicant: CellAssist, LLC, Amherst, MA (US)

(72) Inventor: Hendalee Wilson, Whitinsville, MA (US)

(73) Assignee: Cell Assist, LLC, Amherst, MA (US)

( * ) Notice: Subject to any disclaimer, the term of this patent is extended or adjusted under 35 U.S.C. 154(b) by 158 days.

(21) Appl. No.: 15/937,544

(22) Filed: Mar. 27, 2018

(65) Prior Publication Data

US 2018/0285833 A1 Oct. 4, 2018

Related U.S. Application Data

(63) Continuation of application No. 15/278,160, filed on Sep. 28, 2016, now Pat. No. 9,934,492, which is a continuation of application No. 11/423,873, filed on Jun. 13, 2006, now Pat. No. 9,483,880.

(51) Int. Cl.

| | |
|---|---|
| *B60W 50/02* | (2012.01) |
| *G06Q 10/00* | (2012.01) |
| *H04W 4/029* | (2018.01) |
| *G07C 5/00* | (2006.01) |
| *G06Q 10/08* | (2012.01) |
| *G06Q 30/06* | (2012.01) |
| *H04W 4/02* | (2018.01) |
| *H04W 84/04* | (2009.01) |

(52) U.S. Cl.
CPC .............. *G06Q 10/20* (2013.01); *B60W 50/02* (2013.01); *G06Q 10/0875* (2013.01); *G06Q 30/0635* (2013.01); *G07C 5/008* (2013.01); *H04W 4/029* (2018.02); *H04W 4/02* (2013.01); *H04W 84/042* (2013.01)

(58) Field of Classification Search
CPC .............. G06Q 10/20; G06Q 10/0875; G06Q 30/0635; H04W 4/029; B60W 50/02; G07C 5/008
USPC ......................................................... 701/31.4
See application file for complete search history.

(56) References Cited

U.S. PATENT DOCUMENTS

| | | |
|---|---|---|
| 4,602,127 A | 7/1986 | Neeley et al. |
| 4,843,557 A | 6/1989 | Ina et al. |
| 4,924,398 A | 5/1990 | Fujiwara |
| 4,989,146 A | 1/1991 | Imajo |
| 5,243,852 A | 9/1993 | Morita |
| 5,442,553 A | 8/1995 | Parrillo |
| 5,781,125 A | 7/1998 | Godau et al. |
| 5,844,473 A | 12/1998 | Kaman |
| 5,884,202 A | 3/1999 | Arjomand |
| 6,175,934 B1 | 1/2001 | Hershey et al. |
| 6,253,122 B1 | 6/2001 | Razavi et al. |
| 6,263,268 B1 | 7/2001 | Nathanson |
| 6,278,919 B1 | 8/2001 | Hwang et al. |
| 6,295,492 B1 | 9/2001 | Lang et al. |

(Continued)

*Primary Examiner* — Thomas G Black
*Assistant Examiner* — Wae L Louie

(57) ABSTRACT

The invention is a system for interfacing mobile phones with an on-board diagnostic computer in a vehicle, wherein the on-board diagnostic computer monitors a set of operational characteristics of a vehicle. The information derived from this system will be processed on the mobile phone coupled with additional information and displayed on the mobile phone's screen, while simultaneously transmitting this information over the internet to be stored in a database.

27 Claims, 3 Drawing Sheets

(56) References Cited

U.S. PATENT DOCUMENTS

| | | |
|---|---|---|
| 6,330,499 B1 | 12/2001 | Chou et al. |
| 6,339,736 B1 * | 1/2002 | Moskowitz .......... G06Q 10/087 |
| | | 701/32.7 |
| 6,362,730 B2 | 3/2002 | Razavi et al. |
| 6,370,449 B1 | 4/2002 | Razavi et al. |
| 6,370,454 B1 | 4/2002 | Moore |
| 6,507,810 B2 * | 1/2003 | Razavi ................... G01C 21/26 |
| | | 703/23 |
| 6,668,219 B2 | 12/2003 | Hwang et al. |
| 6,735,503 B2 | 5/2004 | Ames |
| 6,735,630 B1 | 5/2004 | Gelvin et al. |
| 6,754,183 B1 | 6/2004 | Razavi et al. |
| 6,920,382 B2 | 6/2005 | Katagishi et al. |
| 6,956,501 B2 | 10/2005 | Kitson |
| 6,972,669 B2 * | 12/2005 | Saito .................. B60G 17/0185 |
| | | 340/438 |
| 7,023,332 B2 | 4/2006 | Saito et al. |
| 7,073,714 B2 * | 7/2006 | Namaky ............... G07C 5/0816 |
| | | 235/462.15 |
| 7,308,341 B2 | 12/2007 | Schofield et al. |
| 7,363,129 B1 * | 4/2008 | Barnicle ................ G08C 17/02 |
| | | 701/1 |
| 8,666,789 B1 | 3/2014 | Clauss et al. |
| 9,483,880 B2 | 11/2016 | Wilson |
| 9,934,492 B2 | 4/2018 | Wilson |
| 2001/0051863 A1 | 12/2001 | Razavi et al. |
| 2002/0025832 A1 | 2/2002 | Durian |
| 2002/0032042 A1 | 3/2002 | Poplawsky et al. |
| 2002/0044049 A1 * | 4/2002 | Saito .................. B60G 17/0185 |
| | | 340/438 |
| 2003/0008680 A1 | 1/2003 | Huh et al. |
| 2003/0171111 A1 | 9/2003 | Clark |
| 2003/0195678 A1 | 10/2003 | Betters et al. |
| 2004/0227523 A1 * | 11/2004 | Namaky ............... H04L 67/125 |
| | | 324/537 |
| 2004/0249557 A1 * | 12/2004 | Harrington .......... G01M 17/007 |
| | | 701/115 |
| 2005/0043868 A1 * | 2/2005 | Mitcham ............... G07C 5/0858 |
| | | 701/31.4 |
| 2005/0096805 A1 * | 5/2005 | Fudali .................... G07C 5/008 |
| | | 701/31.4 |
| 2005/0131595 A1 | 6/2005 | Luskin et al. |
| 2006/0161315 A1 * | 7/2006 | Lewis ...................... G08G 1/20 |
| | | 701/1 |
| 2007/0156311 A1 * | 7/2007 | Elcock .................... G07C 5/008 |
| | | 701/31.4 |
| 2007/0271014 A1 | 11/2007 | Breed |
| 2009/0125178 A1 * | 5/2009 | Wilson .................. B60W 50/02 |
| | | 701/31.4 |
| 2014/0172228 A1 | 6/2014 | Wilson |
| 2017/0200134 A1 | 7/2017 | Wilson |

\* cited by examiner

AUTOMOTIVE ECU MOBILE PHONE INTERFACE

CROSS-REFERENCE TO RELATED APPLICATIONS

The present application is a continuation of and claims the benefit under 35 U.S.C. § 120 of U.S. patent application Ser. No. 15/278,160, titled "AUTOMOTIVE ECU MOBILE PHONE INTERFACE," filed Sep. 28, 2016, which is a continuation of and claims the benefit under 35 U.S.C. § 120 of U.S. patent application Ser. No. 11/423,873, titled "AUTOMOTIVE ECU MOBILE PHONE INTERFACE," filed Jun. 13, 2006, each of which is incorporated herein by reference in its entirety.

FEDERALLY SPONSORED RESEARCH

Non-applicable.

SEQUENCE LISTING OR PROGRAM

Non-applicable.

BACKGROUND OF INVENTION

The present invention relates to use of a mobile phone to extract automotive data from an automobile's engine control unit (ECU) and translate it into human-readable form on the phone's display, while simultaneously broadcasting the information to an internet-based system for immediate repair and roadside assistance.

Prior Art

The Environmental Protection Agency (EPA) requires vehicle manufacturers to install on-board diagnostics (OBD-II) for monitoring light-duty automobiles and trucks beginning with model year 1996. OBD-II systems (e.g., microcontrollers and sensors) monitor the vehicle's electrical and mechanical systems and generate data that are processed by a vehicle's engine control unit (ECU) to detect any malfunction or deterioration in the vehicle's performance. Most ECUs transmit status and diagnostic information over a shared, standardized electronic bus in the vehicle. The bus effectively functions as an on-board computer network with many processors, each of which transmits and receives data. The primary computers in this network are the vehicle's electronic-control module (ECM) and power-control module (PCM). The ECM typically monitors engine functions (e.g., the cruise-control module, spark controller, exhaust/gas recirculator), while the PCM monitors the vehicle's power train (e.g., its engine, transmission, and braking systems). Data available from the ECM and PCM include vehicle speed, fuel level, engine temperature, and intake manifold pressure. In addition, in response to input data, the ECU also generates 5-digit 'diagnostic trouble codes' (DTCs) that indicate a specific problem with the vehicle. The diagnostic trouble codes need to be coupled with OBD-II documentation so the fault code produced by the vehicle can be conceptualized by the auto owner. For instance a DTC of P0118 can be translated to the text 'Engine coolant temperature circuit high input.' The presence of a DTC in the memory of a vehicle's ECU typically results in illumination of the 'Service Engine Soon' light present on the dashboard of most vehicles.

Data from the above-mentioned systems are made available through a standardized, serial 16-cavity connector referred to herein as an 'OBD-II connector'. The OBD-II connector typically lies underneath the vehicle's dashboard. When a vehicle is serviced, data from the vehicle's ECM and/or PCM is typically queried using an external engine-diagnostic tool (commonly called a 'scan tool') that plugs into the OBD-IL connector. The vehicle's engine is turned on and data are transferred from the engine computer, through the OBD-II connector, and to the scan tool. The data are then displayed and analyzed to service the vehicle. Scan tools are typically only used to diagnose stationary vehicles or vehicles running on a dynamometer.

Some vehicle manufacturers also include complex electronic systems in their vehicles to access and analyze some of the above-described data. For example, General Motors includes a system called 'On-Star' in some of their high-end vehicles. On-Star collects and transmits data relating to these DTCs through a wireless network. On-Star systems are not connected through the OBD-II connector, but instead are wired directly to the vehicle's electronic system. This wiring process typically takes place when the vehicle is manufactured.

Prior to this invention, connecting to the OBD-II interface required large costly hardware, which utilized proprietary software. In addition, many of the tools used to access automobile information returned native codes, which are not in a descriptive form and do not offer any indication of the vehicle's malfunction. Furthermore, a vehicle would have to be transported to a location in which the automobile information could be retrieved. Also, instances arise in which vehicles have stored information that state the vehicle should not be driven any further. This cannot be derived until the vehicle is brought to a location that has the expertise, hardware, and software to tell the owner that this is the case. This could cause extreme and irreversible damage to the vehicle. Lastly, the information about vehicle's information is local. This information is compiled locally and not compiled into a database.

The current state of automotive repair service is one where organization must wait for an individual to come in and try to explain symptoms that they perceive the vehicle as having. Automotive repair services must allocate time and resources after the technician have checked the vehicle. This leads to much inefficiency in resource allocation at these organizations.

Objects and Advantages

The Automotive Cellular Interface is a system that uses cellular phones to access automobile computer systems, interpret the information and show the text on the cellular phone's display. Simultaneously transmitting the retrieved information, as well as characteristic and states of the cellular phone used to access the vehicle computer system, to a global network that would alert parties who could assist or benefit from the retrieved automobile information. An example could be, but not limited to the following scenario.

SUMMARY

The invention is a system for interfacing mobile phones with an on-board diagnostic computer in a vehicle, wherein the on-board diagnostic computer monitors a set of operational characteristics of a vehicle. The information derived from this system will be processed on the mobile phone coupled with additional information and displayed on the mobile phone's screen, while simultaneously transmitting this information over the internet to be stored in a database.

DRAWINGS

DETAILED DESCRIPTION

Figure 1:
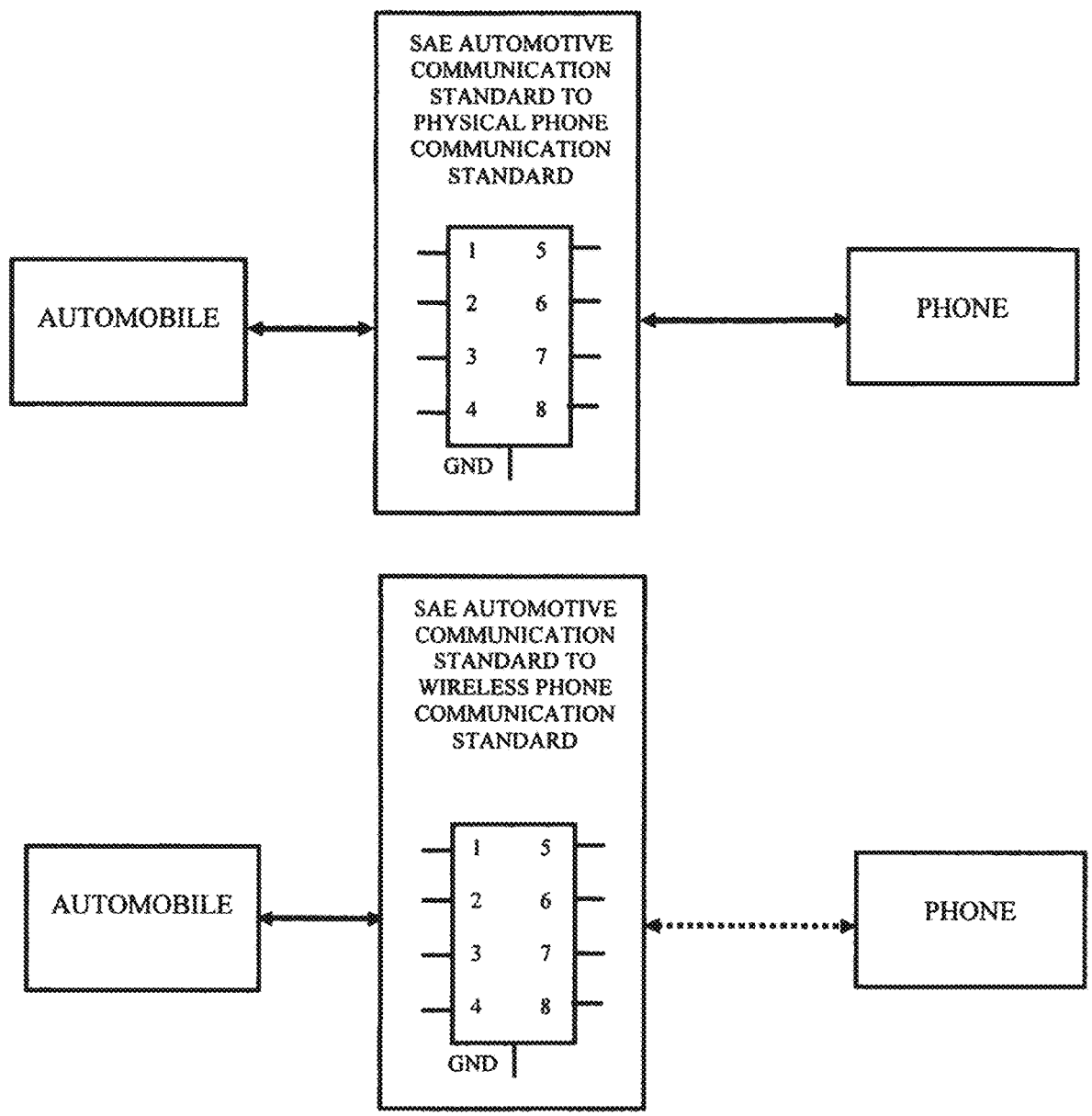
FIG. 1 is a schematic drawing of a system of the invention featuring a single vehicle making contact with the vehicle via a microcontroller.
Figure 2:
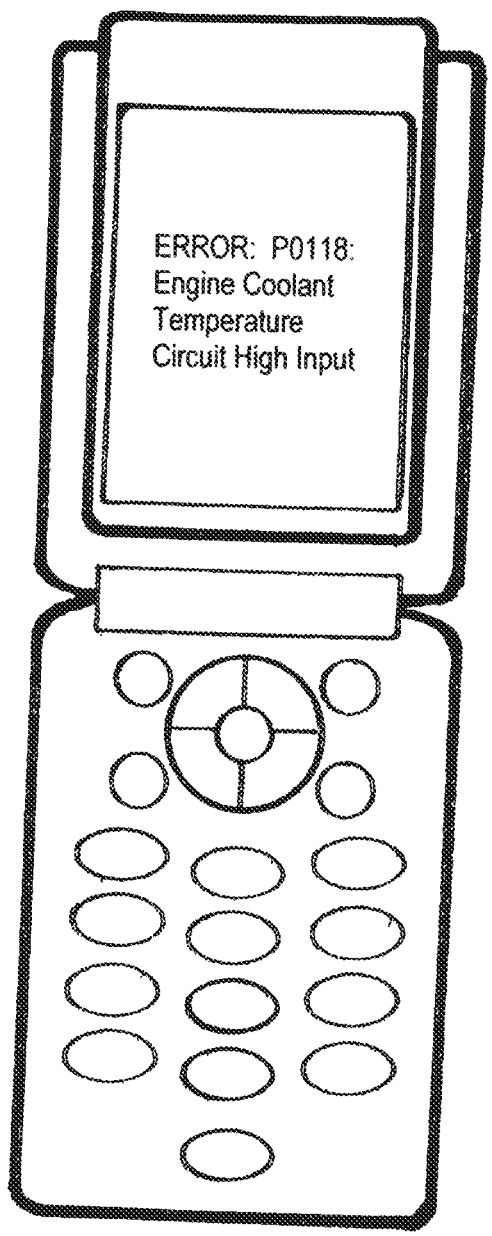
FIG. 2 is an example of the mobile phone display after information has been extracted from the vehicle's ECU.

Description FIG. 1—Shows a cellular phone with software application that can establish a connection with the automobile. In addition, at the point of communication negotiation the application on the cellular phone extracts position location and transmits the response from the vehicle and the location to a server ready to receive this information.

Operation FIG. 1—the standard for the automotive industry for vehicles is the SAE J 1850 communications protocol which utilizes variable pulse width modulation and pulse width modulation. This means that the width of the pulse determines whether it's a 1 or a 0. Most phones form communication with serial connections (RS-232, Infrared, etc.) and wireless connection protocols (Bluetooth, Infrared, etc.). These two protocols must be converted or bridged by some sort of microprocessor so the two communication methodologies can communicate with each other. This can be accomplished by using an 8-pin integrated circuit that can be used to convert the OBD-II signal (which includes different protocols such as, but not limited to: J1850 VPW, J1850 PWM, ISO 9141-2, ISO 14230, ISO 15765) to one of the aforementioned phone communication formats. This can be accomplished by creating an integrated circuit with a Microchip Technology PIC12C5XX 8 pin 8-bit CMOS micro controller (1). The circuit should have a male (GM part #12110252) OBD-II connector and male terminals (GM Part #12047581) on one end and a DB9 serial port connector at the other. It is recommended pins are configured in such a manner that serial hardware handshaking is not required.

The following configuration the microcontroller makes this communication possible:

Pin 1—This pin should be the positive supply pin and should always be the most positive point in the circuit. Internal circuitry connected to this pin should he used to provide power on the reset of the controller, so an external reset signal is not required.

Pin 2 and Pin 3—A 3.57 MHZ NTSC television colourburst crystal is connected between these two pins. Crystal loading capacitors (27 pF) will also be connected between the pin and the common circuit.

Pin 4—The OBD data is input to this pin with a high logic level representing an active state, and a low logic level indicating a passive state. No Schmitt trigger input is provided so the OBD signal should be buffered to minimize transition time for the internal CMOS circuitry.

Pin 5—The transmit signal can be connected directly to this pin as long as a current limiting resistor is installed in series. Internal signal inversion and Schmitt trigger wave shaping provide necessary signal conditioning.

PIN 6—The data output pin.

PIN 7—This is the active low output signal, which is used to drive the OBD bus to its active state.

Pin 8—Circuit common is connected to this pin. This is the most negative point in the circuit.

There are many ways to program this microcontroller for our purpose. Please refer to document 2 for documentation on programming the microcontroller.

These microcontroller aides this process by negotiating timing and voltage differences between automobiles and mobile phones. This is the preferred method as to not damage the automobile computer system and the mobile phone.

Figure 3:
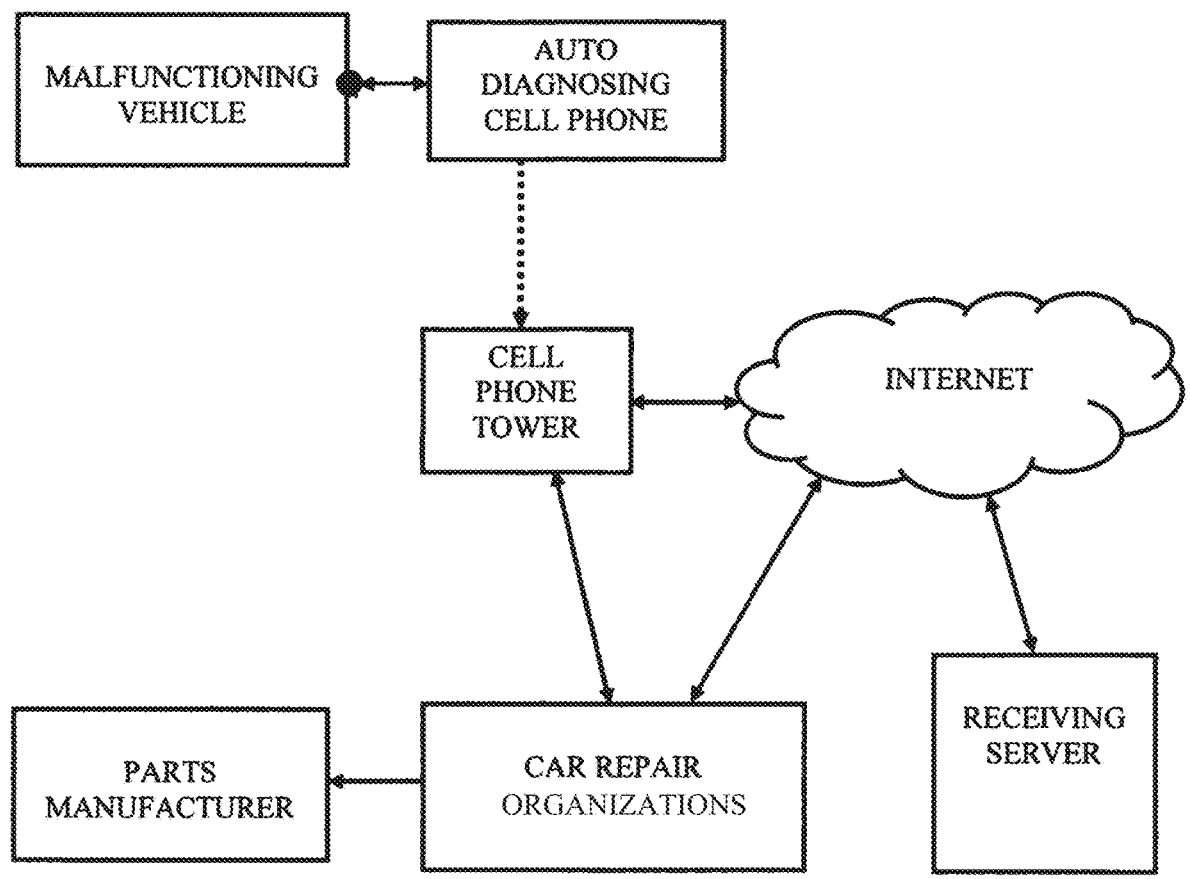
FIG. 3 is a schematic of the flow of information through system of the invention. It shows the dialogue between the users, the system, and organizations connected to the system.

Description FIG. 3—Shows a method describing how the system in FIG. 1 typically operates. The mobile phone operates software that acts as a data-collection agent that connects to a microcontroller connected to the vehicle's OBD-II port that formats that OBD-II data into a communication protocol that the mobile phone can decipher with its native hardware and software.

In one mode of function, the information extracted from the ECUs memory is used to query an information source that has the DTC translation from SAE standard to textual description of information.

At this point other information about the mobile phone and the vehicle's location is being gathered by software housed on the phone. No additional hardware will be added to the phone because federal law mandates that mobile phones have location-based services. Further, information about the mobile phone user, such as phone number, can also be extracted from the phone.

A connection is established to the internet and the above information (the DTC, the location of the malfunctioning vehicle, and the user's contact information) is broadcasted to a server which receives the information and stores the information into a database.

Parties interested in this information can and will be notified when a broadcast happens in their area.

Other embodiments are also within the scope of the invention. The information that is collected in these broadcasts can be utilized for many different purposes. For instance, this information can be used to discover trends in malfunctions or sensor readings in a geographic location. Many organizations (i.e., automobile manufacturers) could use this information to improve their operations. An example of this could be an automobile manufacturer noticing that cars in cold or hot geographic areas have a common component failure and inferring that temperature plays a role in the failure. This information could help auto manufacturers enact costly recalls sooner than later.

In addition, the information received by organizations could be integrated and/or imported into their existing computer information systems to improve operations and increase efficiency. For instance, information that arrives at the repairing organization could be used to automatically order parts necessary for the repair. Also, incoming information could be integrated into the repairing organization's scheduling system so repairs are executed more efficiently.

Furthermore, information derived from this system can be used to increase competition between repairing organizations. Since geographic information is part of the transmitted dataset, local repair shops will have indications on who is broken down and their current location. Repair shops will also have the capacity to contact these individuals (because their cell phone numbers will also be part of the dataset) and offer their services. Organizations will have to realize that automobile malfunctions are now public knowledge and structure the prices of their services accordingly. Automobile owners will have the opportunity to receive bids for many service providers and pursue the most economically viable.

Lastly, users of this system will be able to form more meaningful dialogues with repairing parties because the technical information will be translated into terminology that even the novice would find comprehendible. Instead of the user viewing fault code "P1358" they will see "P1358: Misfire during start cylinder 9," This will form a check and balance when conversations about the extent of the repair occur. A user who sees "P1358: Misfire during start cylinder 9" will instantaneously know they do not need to replace the transmission, thereby avoiding costly, as well as, unnecessary repairs.

What is claimed is:

1. A method of operating a mobile phone to assist in diagnosing a condition in a vehicle, the mobile phone comprising a display screen, and wireless communication circuitry adapted for short-range wireless communication and communication via a cellular communication network, the method comprising:
   wirelessly receiving, at the mobile phone via short-range wireless communication using the wireless communication circuitry, at least one digital communication comprising data indicating at least one operational characteristic that is indicative of the condition in the vehicle, the data having been produced by the vehicle;
   translating, with the mobile phone, the at least one operational characteristic into information describing the condition in the vehicle corresponding to the at least one operational characteristic;
   displaying, on the display screen of the mobile phone, at least some of the information describing the condition; and
   using the wireless communication circuitry, wirelessly exchanging, with a server via the cellular communication network, at least some of the data indicating the at least one operational characteristic produced by the vehicle.

2. The method of claim 1, wherein receiving the data indicating the at least one operational characteristic comprises receiving data indicating a diagnostic code produced by the vehicle.

3. The method of claim 1, wherein receiving the data via short-range wireless communication comprises wirelessly receiving the data according to a wireless personal area networking (WPAN) communication protocol.

4. The method of claim 1, wherein:
   the server is a web server; and
   wirelessly exchanging at least some of the data comprises transmitting at least some of the data to the web server via at least one hypertext transfer protocol (HTTP) message.

5. The method of claim 1, wherein:
   the mobile phone comprises at least one storage medium, the at least one storage medium having encoded thereon a plurality of messages corresponding to a plurality of operational characteristics; and
   translating the data indicating the at least one operational characteristic into the information describing the condition corresponding to the at least one operational characteristic comprises selecting a message of the plurality of messages.

6. The method of claim 1, wherein:
   translating the data indicating the at least one operational characteristic into the information describing the condition corresponding to the at least one operational characteristic comprises querying an information source for information corresponding to the at least one operational characteristic.

7. The method of claim 6, wherein wirelessly exchanging with the server at least some of the data indicating the at least one operational characteristic comprises wirelessly transmitting to the server at least some of the data indicating the at least one operational characteristic together with at least some of the information determined as a result of the querying of the information source.

8. The method of claim 1, wherein:
   the vehicle comprises a diagnostic port; and
   wirelessly receiving the data indicating the at least one operational characteristic comprises wirelessly receiving the data from a device removably coupled to the diagnostic port of the vehicle.

9. The method of claim 8, wherein the device removably coupled to the diagnostic port of the vehicle is disposed within a passenger cabin of the vehicle.

10. The method of claim 1, wherein wirelessly exchanging, with the server via the cellular communication network, at least some of the data indicating the at least one operational characteristic produced by the vehicle comprises wireless exchanging at least some of the data together with at least some of the information describing the condition that was determined using the mobile phone.

11. The method of claim 1, further comprising:
    retrieving second data from a memory of the mobile phone,
    wherein wirelessly exchanging at least some of the data indicating the at least one operational characteristic with the server comprises wirelessly transmitting to the server at least some of the data indicating the at least one operational characteristic together with the second data retrieved from the memory of the mobile phone.

12. The method of claim 11, wherein:
    the second data comprises data generated on the mobile phone using at least one sensor of the mobile phone.

13. The method of claim 11, wherein:
    generating the second data on the mobile phone comprises determining, with a location sensor of the mobile phone, a current geographic location of the mobile phone,
    wherein wirelessly exchanging at least some of the data indicating the at least one operational characteristic together with the second data comprises wirelessly transmitting to the server at least some of the data indicating the at least one operational characteristic together with location data indicating the current geographic location.

14. The method of claim 13, wherein:
    retrieving the second data from the memory comprises determining, with the mobile phone, an identifier for a user of the mobile phone,
    wherein wirelessly transmitting at least some of the data indicating the at least one operational characteristic together with the second data comprises wirelessly transmitting at least some of the data indicating the at least one operational characteristic with the location data and the identifier for the user.

15. The method of claim 14, wherein determining the identifier for the user comprises retrieving from memory of the mobile phone contact information for the user.

16. The method of claim 15, wherein retrieving the contact information associated with the user from memory comprises retrieving, from the memory of the mobile phone, a telephone number of the mobile phone.

17. The method of claim 1, further comprising:
wirelessly receiving, using the wireless communication circuitry and via the cellular communication network, a message from a vehicle repair organization, the message describing a bid by the vehicle repair organization for repair of the condition in the vehicle; and
displaying, on the display screen of the mobile phone, at least a portion of the message describing the bid.

18. The method of claim 17, wherein:
wirelessly receiving the message comprises wirelessly receiving a plurality of messages from a plurality of vehicle repair organizations, each of the plurality of messages including a bid for repair of the condition by a respective vehicle repair organization and identifying a price for the repair; and
displaying at least the portion of the message describing the bid comprises displaying at least a portion of each of the plurality of messages received from the plurality of vehicle repair organizations.

19. The method of claim 1, further comprising:
following the exchanging with the server of at least some of the data indicating the at least one operational characteristic, wirelessly receiving at the mobile phone, using the wireless communication circuitry and via the cellular communication network, a message from a vehicle service organization; and
displaying, on the display screen of the mobile phone, at least a portion of the message from the vehicle service organization.

20. A system to assist in diagnosing a condition in a vehicle, the system comprising:
a mobile phone comprising:
a display screen,
at least one first wireless transceiver to wirelessly communicate according to a first wireless networking protocol,
at least one second wireless transceiver to wirelessly communicate via the cellular communication network according to a cellular communication protocol,
at least one first processor, and
at least one first storage medium having encoded thereon executable instructions that, when executed by the at least one first processor, cause the at least one first processor to carry out a first method comprising:
receiving, via the at least one first wireless transceiver of the mobile phone, data indicating at least one operational characteristic that is indicative of the condition in the vehicle, the data having been produced by the vehicle;
translating, with the mobile phone, the data indicating the at least one operational characteristic into a message indicating the condition corresponding to the at least one operational characteristic;
displaying, on the display screen of the mobile phone, the message indicating the condition; and
wirelessly transmitting, via the at least one second wireless transceiver of the mobile phone, at least some of the data indicating the at least one operational characteristic to a server via the cellular communication network.

21. The system of claim 20, further comprising:
a device comprising:
an input to removably couple to a vehicle diagnostic port;
a third wireless transceiver to wirelessly communicate according to the first wireless networking protocol;
at least one second processor; and
at least one second storage medium having encoded thereon executable instructions that, when executed by the at least one second processor, cause the at least one second processor to carry out a second method comprising:
receiving the data indicating the at least one operational characteristic from the vehicle via the input; and
wirelessly transmitting the data indicating the at least one operational characteristic to the mobile phone using the third wireless transceiver.

22. The system of claim 21, wherein:
receiving the data from the vehicle comprises receiving the data from the vehicle in a first format;
wirelessly transmitting the data to the mobile phone comprises wirelessly transmitting the data in a second format; and
the second method further comprises translating the data from the first format to the second format.

23. The system of claim 20, wherein:
the first method further comprises determining, with the mobile phone, a current geographic location of the mobile phone; and
wherein wirelessly transmitting the data to the server comprises wirelessly transmitting the data together with location data indicating the current geographic location.

24. At least one non-transitory storage medium having encoded thereon executable instructions that, when executed by at least one processor of a mobile phone, cause the at least one processor to carry out a method of operating the mobile phone to assist in diagnosing a condition in a vehicle, the mobile phone comprising a display screen, at least one first wireless transceiver to wirelessly communicate according to a first wireless networking protocol, at least one second wireless transceiver to wirelessly communicate via a cellular communication network according to a cellular communication protocol, and the at least one processor, the method comprising:
wirelessly receiving, at the mobile phone, data indicating a diagnostic code produced by the vehicle that is indicative of a condition in the vehicle;
translating, with the mobile phone, the data indicating the diagnostic code into information describing the condition corresponding to the diagnostic code;
displaying, on the display screen of the mobile phone, the information describing the condition; and
using the at least one second wireless transceiver of the mobile phone, wirelessly transmitting at least some of the data indicating the diagnostic code via the cellular communication network.

25. The at least one storage medium of claim 24, wherein the method further comprises:
determining, with the mobile phone, a current geographic location of the mobile phone,
wherein wirelessly transmitting at least some of the data comprises wirelessly transmitting at least some of the data together with location data indicating the current geographic location.

26. The at least one storage medium of claim 25, wherein:
wirelessly transmitting at least some of the data comprises wirelessly transmitting at least some of the data together with the location data and a telephone number of the mobile phone.

27. The at least one storage medium of claim 24, wherein:
  receiving the data indicating the diagnostic code comprises receiving the data from a device removably coupled to a diagnostic port of the vehicle.

* * * * *